(12) United States Patent
Goel et al.

(10) Patent No.: US 11,752,832 B2
(45) Date of Patent: *Sep. 12, 2023

(54) PEAK DEMAND RESPONSE OPERATION OF HVAC SYSTEMS

(71) Applicant: Lennox Industries Inc., Richardson, TX (US)

(72) Inventors: Rakesh Goel, Irving, TX (US); Vijaykumar Sathyamurthi, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/237,922

(22) Filed: Apr. 22, 2021

(65) Prior Publication Data

US 2021/0237535 A1    Aug. 5, 2021

Related U.S. Application Data

(63) Continuation of application No. 16/542,921, filed on Aug. 16, 2019, now Pat. No. 11,034,210.

(51) Int. Cl.
*B60H 1/00* (2006.01)
*F04D 27/00* (2006.01)
(Continued)

(52) U.S. Cl.
CPC ....... *B60H 1/00735* (2013.01); *B60H 1/3205* (2013.01); *B60H 1/3222* (2013.01);
(Continued)

(58) Field of Classification Search
CPC .............. F25B 49/22; F25B 2600/0253; F25B 2600/112; F25B 49/022; F24F 11/46;
(Continued)

(56) References Cited

U.S. PATENT DOCUMENTS 2,299,531 A * 10/1942 Crawford ................ F24F 3/001
                                                                237/19
5,062,276 A * 11/1991 Dudley .................... F24F 11/46
                                                                62/176.6

(Continued)

*Primary Examiner* — Marc E Norman
(74) *Attorney, Agent, or Firm* — Baker Botts L.L.P.

(57) ABSTRACT

An HVAC system includes a variable-speed compressor which compresses refrigerant flowing through the HVAC system, a blower which provides a flow of air through the HVAC system at a controllable flow rate, and a controller communicatively coupled to the variable-speed compressor and the blower. The controller receives a demand request, which includes a command to operate the HVAC system at a predefined setpoint temperature. In response to receiving the demand request, a setpoint temperature associated with the HVAC system can be adjusted to the predefined setpoint temperature. A speed of the variable-speed compressor is decreased to a low-speed setting. Based on the decreased speed of the variable-speed compressor, an air-flow rate can be determined to provide by the blower. The controllable flow rate of the flow of air provided by the blower can be adjusted based on the determined air-flow rate.

25 Claims, 7 Drawing Sheets

(51) Int. Cl.
*B60H 1/32* (2006.01)
*F24F 11/46* (2018.01)
*F25B 49/02* (2006.01)

(52) U.S. Cl.
CPC ............ *F04D 27/004* (2013.01); *F24F 11/46* (2018.01); *F25B 49/022* (2013.01); *F25B 2600/0253* (2013.01); *F25B 2600/112* (2013.01)

(58) Field of Classification Search
CPC ... F24F 11/47; B60H 1/00735; B60H 1/3205; B60H 1/3222; F04D 27/004
See application file for complete search history.

(56) References Cited

U.S. PATENT DOCUMENTS

| | | | |
|---|---|---|---|
| 5,095,715 A * | 3/1992 | Dudley | F24D 17/02 62/230 |
| 8,280,556 B2 | 10/2012 | Besore et al. | |
| 11,009,249 B2 * | 5/2021 | Goel | F24F 11/76 |
| 11,034,210 B2 * | 6/2021 | Goel | F24F 11/64 |
| 2008/0314998 A1 | 12/2008 | Herzon et al. | |
| 2012/0303165 A1 | 11/2012 | Qu et al. | |
| 2017/0227246 A1 * | 8/2017 | Rajan | F24F 1/38 |
| 2017/0356668 A1 | 12/2017 | Goel | |
| 2021/0046800 A1 | 2/2021 | Goel et al. | |
| 2021/0048211 A1 | 2/2021 | Goel et al. | |
| 2021/0048212 A1 | 2/2021 | Goel et al. | |

* cited by examiner

PEAK DEMAND RESPONSE OPERATION OF HVAC SYSTEMS

CROSS-REFERENCE TO RELATED APPLICATIONS

This application is a continuation of U.S. patent application Ser. No. 16/542,921 filed Aug. 16, 2019, by Rakesh Goel et al., and entitled "PEAK DEMAND RESPONSE OPERATION OF HVAC SYSTEMS," which is incorporated herein by reference.

TECHNICAL FIELD

The present disclosure relates generally to heating, ventilation, and air conditioning (HVAC) systems and methods of their use. In certain embodiments, the present disclosure relates to peak demand response operation of HVAC systems.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY OF THE DISCLOSURE

In an embodiment, an HVAC system includes a variable-speed compressor configured to compress refrigerant flowing through the HVAC system, a blower configured to provide a flow of air through the HVAC system at a controllable flow rate, and a controller communicatively coupled to the variable-speed compressor and the blower. The controller receives a demand request, which includes a command to operate the HVAC system at a predefined setpoint temperature. In response to receiving the demand request, a setpoint temperature associated with the HVAC system is adjusted to the predefined setpoint temperature. The variable-speed compressor is adjusted to a low-speed setting, thereby operating the HVAC system at a first tonnage of cooling corresponding to the decreased speed of the variable-speed compressor. The rate of the flow of air provided by the blower is adjusted to a first flow rate, such that a ratio of the first flow rate to the first tonnage of cooling is increased to a first predefined value.

In another embodiment, an HVAC system includes a variable-speed compressor configured to compress refrigerant flowing through the HVAC system, a blower configured to provide a flow of air through the HVAC system at a controllable flow rate, and a controller communicatively coupled to the variable-speed compressor and the blower. The controller is configured to receive a demand request, which includes a command to operate the HVAC system at a predefined setpoint temperature. In response to receiving the demand request, a setpoint temperature associated with the HVAC system is adjusted to the predefined setpoint temperature. A speed of the variable-speed compressor is decreased to a low-speed setting. Based on the decreased speed of the variable-speed compressor, an air-flow rate is determined to provide by the blower. The controllable flow rate of the flow of air provided by the blower is adjusted based on the determined air-flow rate.

In yet another embodiment, an HVAC system includes a cooling unit with a face-split evaporator. The face-split evaporator includes a top evaporator circuit positioned above a bottom evaporator circuit. The top evaporator circuit is configured to transfer heat from a first portion of a flow of air passing across the top evaporator circuit to refrigerant in the top evaporator circuit. The bottom evaporator circuit is configured to transfer heat from a second portion of the flow of air passing across the bottom evaporator circuit to refrigerant in the bottom evaporator circuit. The system further includes a first compressor associated with the top evaporator circuit and configured to compress refrigerant received from the top evaporator circuit, a second compressor associated with the bottom evaporator circuit and configured to compress refrigerant received from the bottom evaporator circuit, and a controller communicatively coupled to the first compressor and the second compressor. The controller receives a demand request, which includes a command to reduce power consumption by the HVAC system by a predefined percentage. In response to receiving the demand request, the second compressor is turned off to inactivate the bottom evaporator circuit such that power consumption by the HVAC system is decreased by at least the predefined percentage associated with the demand request. A first portion of a liquid condensate formed on a surface of the top evaporator circuit is allowed to fall on a surface of the bottom evaporator circuit such that the second portion of the flow of air is evaporatively cooled by the first portion of the liquid condensate.

In some cases, HVAC systems may be required to operate under restricted operating requirements to reduce power consumption during times of peak electricity demand, referred to in this disclosure as peak demand response times. For example, a third party such as a utility provider may enforce certain operating restrictions upon HVAC systems during peak demand response times. A peak demand response time may correspond, for example, to a time period associated with high outdoor temperatures or any other time when electrical power consumption is expected (e.g., based on a forecast or projection) to be increased. Generally, the third party (e.g., a utility provider) provides a command request which specifies either a setpoint temperature or a reduction of power consumption at which an HVAC system should operate during a peak demand response time. In some cases, the demand request may be provided via an electronic signal. The demand request may be transmitted to a controller of the HVAC system to communicate operating requirements that are to be enforced during a peak demand response time.

The unconventional HVAC systems contemplated in the present disclosure solve problems of previous systems by facilitating improved cooling during a peak demand response time (e.g., by increasing sensible capacity during the peak demand response time). The present disclosure encompasses the recognition that the sensible capacity of HVAC systems may be increased during peak demand response times by temporarily modifying operating parameters of the HVAC system to improve comfort in a conditioned space while still satisfying the requirements of a demand request. For example, a speed of a compressor of the HVAC system may be temporarily decreased to increase a sensible heat ratio of the HVAC system and improve the sensible capacity of the HVAC system during a peak demand response time. In this way the HVAC system may continue to effectively cool a space while still satisfying requirements of a demand request (e.g., to increase a setpoint temperature or reduce power consumption by a given percentage). In some embodiments, the systems and methods described in this disclosure are configured to exploit the benefits of evaporative cooling to provide improved sensible capacity, and thereby provide more comfortable temperatures during peak demand response times than was possible using previous technologies. Moreover, the systems and methods described in this disclosure may be integrated into a practical application for improving the performance and sensible cooling capacity of HVAC systems during peak demand response times.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
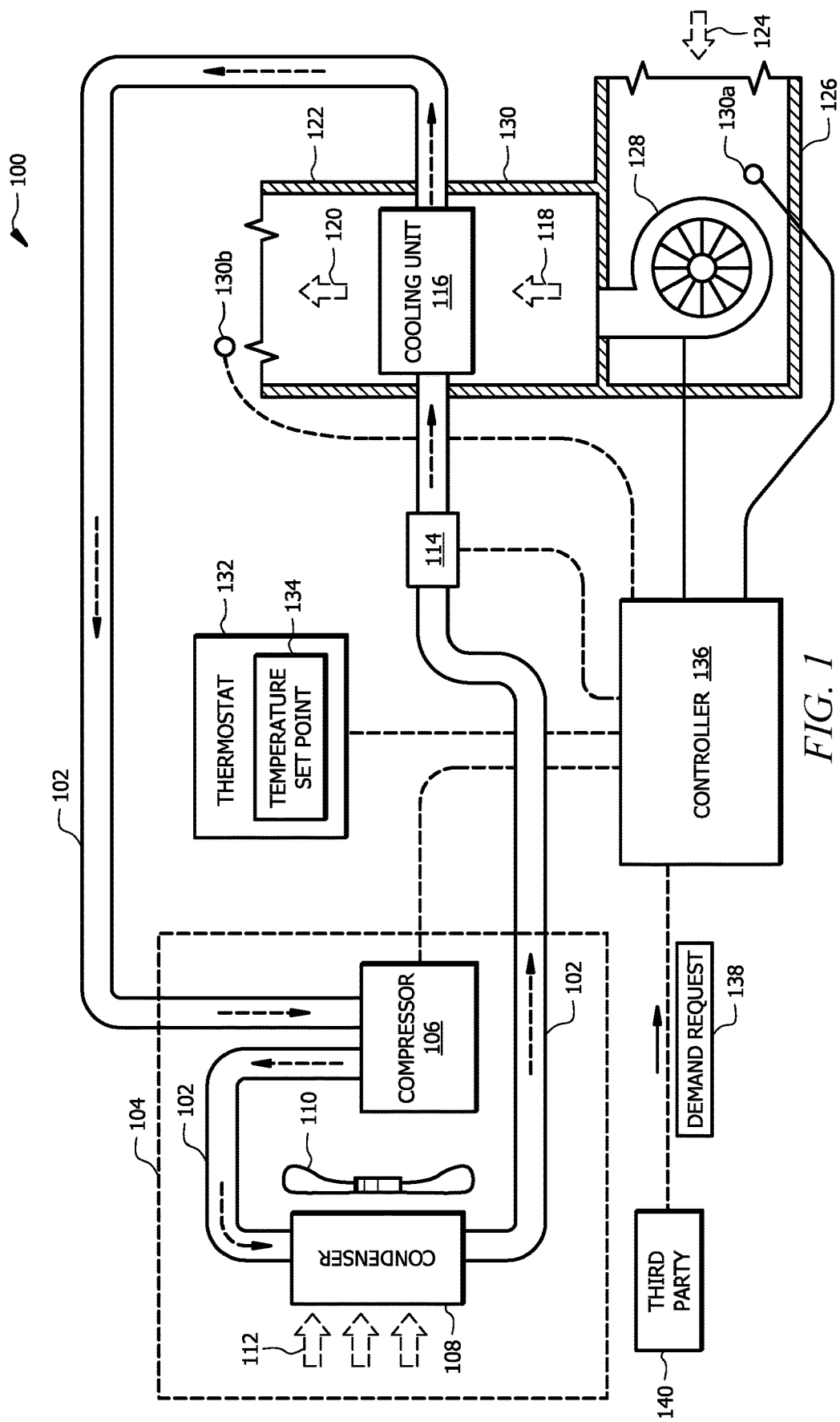
FIG. 1 is a diagram of an example HVAC system configured for operation according to a demand request.

Embodiments of the present disclosure and its advantages are best understood by referring to FIGS. 1 through 7 of the drawings, like numerals being used for like and corresponding parts of the various drawings.

The extent of cooling and dehumidification an HVAC system can achieve is generally determined by its sensible capacity (Sc) and latent capacity (Lc). Each HVAC system has a total capacity (Tc), which is the sum of the sensible capacity and latent capacity (i.e., Tc=Sc+Lc). Generally, sensible capacity refers to an ability of the HVAC system to remove sensible heat from conditioned air (i.e., to cool the air). As used herein, sensible heat refers to heat that, when added to or removed from the air, results in a temperature change of the conditioned air. Comparatively, latent heat refers to the ability of an HVAC system to remove latent heat from conditioned air (i.e., to dehumidify the air). As used herein, latent heat refers to heat that, when added to or removed from the conditioned air, results in a phase change of, for example, water within the conditioned air. Sensible capacity and latent capacity may vary with environmental conditions.

HVAC systems are generally operated to achieve a sensible heat ratio ("S/T ratio"), where S/T ratio=Sc/Tc, of about 0.75. For the example of a 0.75 S/T ratio, an HVAC system is devoting 75% of its total capacity to removing sensible heat (i.e., for cooling) and 25% of its total capacity to remove latent heat (i.e., for dehumidification). Generally, an increased S/T ratio relative to this value is associated with an increase in the humidity of the conditioned air, while a decreased S/T ratio is associated with dehumidification of the conditioned air.

The S/T ratio generally changes proportionally with the ratio of the flow rate of air provided by the blower to the tonnage of the HVAC system (i.e., the "CFM/ton" of the HVAC system). The flow rate of air provided by the blower is generally measured in units of cubic feet per minute (CFM). The tonnage of the HVAC system corresponds to the cooling capacity of the system, where one "ton" of cooling corresponds to 12000 Btu/hr. The tonnage of the HVAC system is largely determined by the speed of the compressor (s) of the system, such that a decreased compressor speed corresponds to a decreased tonnage. The relationship between compressor speed and system tonnage is approximately linear. Accordingly, the CFM/ton value of an HVAC system, and thus the associated S/T Ratio, may be controlled by adjusting the flow rate of air provided by the blower and/or the tonnage of the HVAC system. For example, at a constant air flow rate from the blower, the speed of a variable-speed compressor may be decreased, to increase the CFM/ton value and the associated S/T Ratio of the system.

As described above, prior to the present disclosure, there was a lack of tools for improving comfort in a conditioned space in response to a demand request. This disclosure encompasses the unique recognition that the S/T ratio or the CFM/ton of an HVAC system can be increased to more effectively maintain comfortable temperatures in a conditioned space during a peak demand response time while still fulfilling the requirements of an associated demand request (e.g., to operate at a predefined setpoint temperature or at a reduced power consumption). For example, the temperature in a conditioned space may increase less rapidly during a peak demand response time when the efficiency modes described in this disclosure are employed.

HVAC System

FIG. 1 is a schematic diagram of an embodiment of an HVAC system 100 configured for operation during a peak demand response time. The HVAC system 100 conditions air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion (s) of the system may be located within the building and portion(s) outside the building. The HVAC system may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, at least one condensing unit 104, an expansion valve 114, a cooling unit 116, a thermostat 132, and a controller 136. The HVAC system 100 is generally configured to operate at an increased sensible capacity when a demand request 138 is received from third part 140 which indicates that the HVAC system 100 is required to operate under conditions associated with decreased power consumption. For example, the demand request 138 may indicate that the HVAC system 100 must be operated at a predefined setpoint temperature (e.g., a setpoint temperature that is higher than may be preferred for comfort to occupants of a space conditioned by the HVAC system 100) or at a predefined percentage reduction of power consumption during a peak demand response time. In response to the demand request 138, the HVAC system 100 is operated according to an efficiency mode, illustrative examples of which are described in greater detail below, which provides improved cooling during the peak demand response time than was possible using previous technologies, while still satisfying operating requirements associated with the demand request 138.

The working fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The condensing unit 104 includes a compressor 106, a condenser 108, and a fan 110. In some embodiments, the condensing unit 104 is an outdoor unit while other components of system 100 may be indoors. The compressor 106 is coupled to the working-fluid conduit subsystem 102 and compresses (i.e., increases the pressure of) the working fluid. The compressor 106 of condensing unit 104 may be a variable-speed or multi-stage compressor. A variable-speed compressor is generally configured to operate at different speeds to increase the pressure of the working fluid to keep the working fluid moving along the working-fluid conduit subsystem 102. In the variable-speed compressor configuration, the speed of compressor 106 can be modified to adjust the cooling capacity of the HVAC system 100. Meanwhile, a multi-stage compressor may include multiple compressors, each configured to operate at a constant speed to increase the pressure of the working fluid to keep the working fluid moving along the working-fluid conduit subsystem 102. In the multi-stage compressor configuration, one or more compressors can be turned on or off to adjust the cooling capacity of the HVAC system 100. As described in greater detail below with respect to FIG. 5, in certain embodiments, the HVAC system 100 may include two or more condensing units (e.g., condensing units 506 and 512 of FIG. 5).

The compressor 106 is in signal communication with the controller 136 using wired or wireless connection. The controller 136 provides commands or signals to control operation of the compressor 106 and/or receives signals from the compressor 106 corresponding to a status of the compressor 106. For example, when the compressor 106 is a variable-speed compressor, the controller 136 may provide signals to control the compressor speed. When the compressor 106 operates as a multi-stage compressor, the signals may correspond to an indication of which compressors to turn on and off to adjust the compressor 106 for a given cooling capacity. The controller 136 may operate the compressor 106 in different modes corresponding to load conditions (e.g., the amount of cooling or heating required by the HVAC system 100). As described in greater detail below, operation of the compressor 106 may be adjusted by the controller 136 before, during, and/or after a peak demand response time to increase the sensible capacity of the HVAC system 100 during a peak demand response time. The controller 136 is described in greater detail below with respect to FIG. 7.

The condenser 108 is configured to facilitate movement of the working fluid through the working-fluid conduit subsystem 102. The condenser 108 is generally located downstream of the compressor 106 and is configured to remove heat from the working fluid. The fan 110 is configured to move air 112 across the condenser 108. For example, the fan 110 may be configured to blow outside air through the condenser 108 to help cool the working fluid flowing there through. The compressed, cooled working fluid flows from the condenser 108 toward an expansion device 114.

The expansion device 114 is coupled to the working-fluid conduit subsystem 102 downstream of the condenser 108 and is configured to remove pressure from the working fluid. In this way, the working fluid is delivered to the cooling unit 116 and receives heat from airflow 118 to produce a conditioned airflow 120 that is delivered by a duct subsystem 122 to the conditioned space. In general, the expansion device 114 may be a valve such as an expansion valve or a flow control valve (e.g., a thermostatic expansion valve valve) or any other suitable valve for removing pressure from the working fluid while, optionally, providing control of the rate of flow of the working fluid. The expansion device 114 may be in communication with the controller 136 (e.g., via wired and/or wireless communication) to receive control signals for opening and/or closing associated valves and/or provide flow measurement signals corresponding to the rate of working fluid flow through the working fluid subsystem 102.

The cooling unit 116 is generally any heat exchanger configured to provide heat transfer between air flowing through the cooling unit 116 (i.e., air contacting an outer surface of one or more coils of the cooling unit 112) and working fluid passing through the interior of the cooling unit 116. For example, the cooling unit 116 may be or include an evaporator coil. More specifically, the cooling unit 116 may be or include a row/split intertwined evaporator (e.g., as described in greater detail below with respect to FIG. 4) or a face-split evaporator (e.g., as described in greater detail below with respect to FIGS. 5 and 6). The cooling unit 116 is fluidically connected to the compressor 106, such that working fluid generally flows from the cooling unit 116 to the condensing unit 104. A portion of the HVAC system 100 is configured to move air 118 across the cooling unit 116 and out of the duct sub-system 122 as conditioned airflow 120. Return air 124, which may be air returning from the building, fresh air from outside, or some combination, is pulled into a return duct 126.

A suction side of a blower 128 pulls the return air 124. The blower 128 discharges airflow 118 into a duct 130 such that airflow 118 crosses the cooling unit 116 or heating elements (not shown) to produce conditioned airflow 120. The blower 128 is any mechanism for providing a flow of air through the HVAC system 100. For example, the blower 128 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower. The blower 128 is in signal communication with the controller 136 using any suitable type of wired or wireless connection. The controller 136 is configured to provide commands and/or signals to the blower 128 to control its operation. For example, the controller 136 may be configured to send signals to the blower 128 to adjust the speed of the blower 128, for example, to increase the cooling capacity of the HVAC system 100 during a peak demand response time, as described in greater detail below.

The HVAC system 100 includes one or more sensors 130$a$-$b$ in signal communication with the controller 136. The sensors 130$a$-$b$ may include any suitable type of sensor for measuring air temperature, relative humidity, and/or any other properties of a conditioned space (e.g. a room or building). The sensors 130$a$-$b$ may be positioned anywhere within the conditioned space, the HVAC system 100, and/or the surrounding environment. For example, as shown in the illustrative example of FIG. 1, the HVAC system 100 may include a sensor 130a positioned and configured to measure a return air temperature (e.g., of airflow 124) and/or a sensor 130b positioned and configured to measure a supply or treated air temperature (e.g., of airflow 120), a temperature of the conditioned space, and/or a relative humidity of the conditioned space. In other examples, the HVAC system 100 may include sensors positioned and configured to measure any other suitable type of air temperature (e.g., the temperature of air at one or more locations within the conditioned space and/or an outdoor air temperature) or other property (e.g., a relative humidity of air at one or more locations within the conditioned space).

The HVAC system 100 includes a thermostat 132, for example, located within the conditioned space (e.g. a room or building). The thermostat 132 is generally in signal communication with the controller 136 using any suitable type of wired or wireless connection. The thermostat 132 may be a single-stage thermostat, a multi-stage thermostat, or any suitable type of thermostat as would be appreciated by one of ordinary skill in the art. The thermostat 132 is configured to allow a user to input a desired temperature or temperature setpoint 134 of the conditioned space for a designated space or zone such as a room in the conditioned space. The controller 136 may use information from the thermostat 132 such as the temperature setpoint 134 for controlling the compressor 106 and/or the blower 128. In some embodiments, the thermostat 132 includes a user interface for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for input of the temperature setpoint 134 and display of any alerts and/or messages related to the status and/or operation of the HVAC system 100.

As described in greater detail below, the controller 136 is configured to receive a demand request 138 from a third party 140. The demand request 138 may correspond to information transmitted via an electronic signal from the third party 140. Generally, the controller 136 is configured to receive and interpret the demand request 138 and to appropriately adjust operation of the HVAC system 100 to satisfy operating requirements associated with the demand request 138. The demand request 138 is generally associated with a time interval (e.g., a start and stop time) during which certain operating requirements should or must be enforced for the HVAC system 100. The time interval of the demand request 138 may correspond to a peak demand response time (e.g., a time during which electrical power consumption should be decreased). The operating requirements of the demand request 138 may be associated with a predefined setpoint temperature (i.e., a value at which the temperature setpoint 134 must be set during the time interval), an amount (e.g., a percentage) by which the HVAC system 100 must decrease its power consumption, an amount of power that can be consumed by the HVAC system 100, or the like. In general, the demand request 138 may include any appropriate demand requirement associated with decreasing power consumed by the HVAC system 100, as would be appreciated by a person skilled in the art. The third party 140, which provides the demand request 138, may be a utility provider or any other entity with administrative privileges over operation of the HVAC system 100.

As described above, in certain embodiments, connections between various components of the HVAC system 100 are wired. For example, conventional cable and contacts may be used to couple the controller 136 to the various components of the HVAC system 100, including, the compressor 106, the expansion valve 114, the blower 128, sensor(s) 130a-b, and thermostat(s) 132. In some embodiments, a wireless connection is employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 136 to other components of the HVAC system 100.

In an example operation of HVAC system 100, the HVAC system 100 starts up to provide cooling to an enclosed space based on temperature setpoint 134. For example, in response to the indoor temperature exceeding the temperature setpoint 134, the controller 136 may cause the compressor 106 and the blower 128 to turn on to startup the HVAC system 100. The HVAC system 100 is generally operated in a normal cooling mode (e.g., associated with a CFM/ton value in a range from about 400 to 450 CFM/ton or an S/T ratio in a range from about 0.7 to 0.75). Upon receipt of a demand request 138, the controller 136 may determine a start time and operating requirements of the demand request 138. For example, the controller may determine, based on the demand request 138, that the HVAC system must be operated according to certain energy-saving requirements (e.g., at a particular setpoint temperature or at a particular percentage of the current power consumption) starting at a predefined time in the future and lasting for predefined time interval corresponding to a peak demand response time. The present disclosure contemplates various efficiency modes in which to operate the HVAC system 100 in order to provide more comfortable (e.g., cooler) temperatures than could be achieved during a peak demand response time using previous technologies. Each efficiency mode generally facilitates operation at an increased sensible capacity while still satisfying the operating requirements associated with the demand request 138.

For example, if the demand request 138 includes a requirement to operate the HVAC system at a predefined setpoint temperature, the controller 136 may cause the temperature setpoint 134 to be set to this predefined setpoint temperature. In general, the predefined setpoint temperature is a temperature value that is greater than would generally be preferred for the comfort of individuals occupying a space conditioned by the HVAC system 100. For example, in some embodiments, the predefined setpoint temperature is 77° F. or greater. In some embodiments, the controller 136 may cause the speed of the compressor 106 to be decreased. The speed of the blower 128 may then be adjusted to a value based on an efficiency mode CFM/ton value (e.g., to values in a range from about 500-700 CFM/ton, as described with respect to the first efficiency mode illustrated in FIG. 3B below) or based on a calculated value (e.g., as described with respect to the second efficiency mode illustrated in FIG. 4 below). In some embodiments, the controller 136 may employ a feedback loop to determine and set the speeds of the compressor 106 and/or blower 128 based on a measured temperature of the conditioned space (e.g., as also described with respect to the second efficiency mode illustrated FIG. 4 below). For example, speeds for the compressor 106 and/or the blower 128 may be established to increase any one or more of the cooling capacity of the HVAC system 100, the efficiency of the HVAC system 100, or any other appropriate performance metric of the HVAC system 100.

As another example, if the demand request 138 includes a requirement to operate the HVAC system 100 at a predefined percentage of current power consumption (e.g., or a predefined percentage of maximum power consumption) for the HVAC system 100, the controller 136 may adjust the speed of the compressor 106 such that the required percentage of power consumption is obtained. The controller 136 will further (i.e., while still maintaining the percentage of power consumption required by the demand response 138) adjust the speeds of the compressor 106 and/or blower 128 to values that achieve an efficiency mode CFM/ton value (e.g., to values in a range from about 500-700 CFM/ton, as described with respect to the first efficiency mode illustrated in FIG. 3B below). The speed of the blower 128 may alternatively be determined and set based on a calculated value and/or via a feedback control loop (e.g., as described with respect to the second efficiency mode illustrated in FIG. 4 below), while satisfying the required power reduction of the demand request 138.

In some embodiments, the cooling unit 116 includes a face-split evaporator which includes a top circuit positioned above a bottom circuit (e.g., as described with respect to FIG. 5 below). In such embodiments, the controller 136 may implement a third efficiency mode of operation and cause, in response to receiving the demand request 138, the bottom evaporator circuit to act as an evaporative cooler, for example, by deactivating a compressor associated with this circuit (e.g., a compressor that provides a flow of working fluid through the bottom circuit). As described in greater detail below with respect to FIGS. 5 and 6, deactivating the bottom circuit of the face-split evaporator may provide improved sensible capacity during the demand response time associated with the demand request 138.

Figure 2:
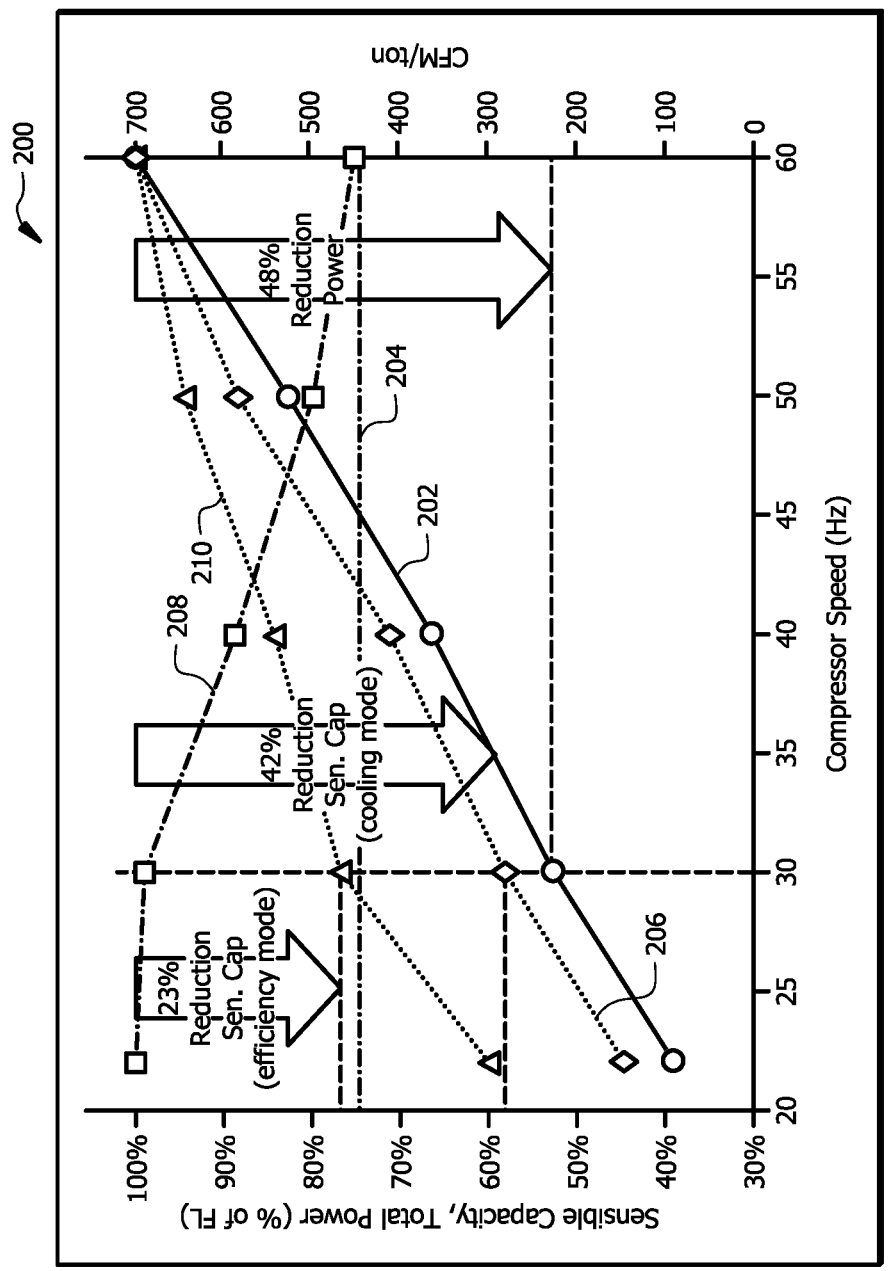
FIG. 2 is a plot of HVAC operating metrics versus compressor speed for an example HVAC system.

FIG. 2 shows an example plot 200 demonstrating certain benefits of the systems and methods described in this disclosure. The plot 200 includes values of the percentage of total power consumed 202, the CFM/ton value 204 during normal cooling mode operation of the HVAC system, the corresponding sensible capacity 206 during cooling mode operation, the adjusted CFM/ton value 208 during an example efficiency mode operation, and the corresponding sensible capacity 210 during efficiency mode operation. The total power consumed 202 generally decreases with decreasing compressor speed. During cooling mode operation, the CFM/ton value 204 (e.g., or an associated S/T ratio) remains approximately constant at a value near 400 to 450 CFM/ton, and the sensible capacity 206 decreases relatively sharply with decreasing compressor speed. In contrast, during efficiency mode operation, the CFM/ton value 208 (e.g., or an associated S/T ratio) is increased, and the corresponding sensible capacity 210 decreases less rapidly with decreasing compressor speed.

As further illustrated in FIG. 2, if a 48% reduction of total power consumption 202 is enforced by a demand request 138, the compressor speed is decreased to an appropriate speed of 30 Hz to achieve this power reduction. The sensible capacity 206 achieved during normal cooling mode operation at 30 Hz compressor speed decreases by about 42%. Meanwhile, for the same 48% reduction of total power consumption 202 (i.e., at a compressor speed of 30 Hz), the sensible capacity 210 during efficiency mode operation only decreases by about 23%. Because the efficiency-mode sensible capacity 210 is maintained nearer its original value (i.e., with a smaller percent reduction of 23% vs. 48%), efficiency mode operation provides improved cooling compared to that possible using conventional cooling strategies of previous technologies. Since an increase in the sensible capacity is generally associated with a corresponding decrease in latent capacity, in some embodiments, the controller may cause the HVAC system 100 to operate in a dehumidification mode prior to operating in the various efficiency modes described below (e.g., to help maintain the conditioned space at or near a desired relative humidity value during a peak demand response time).

Figure 3A:
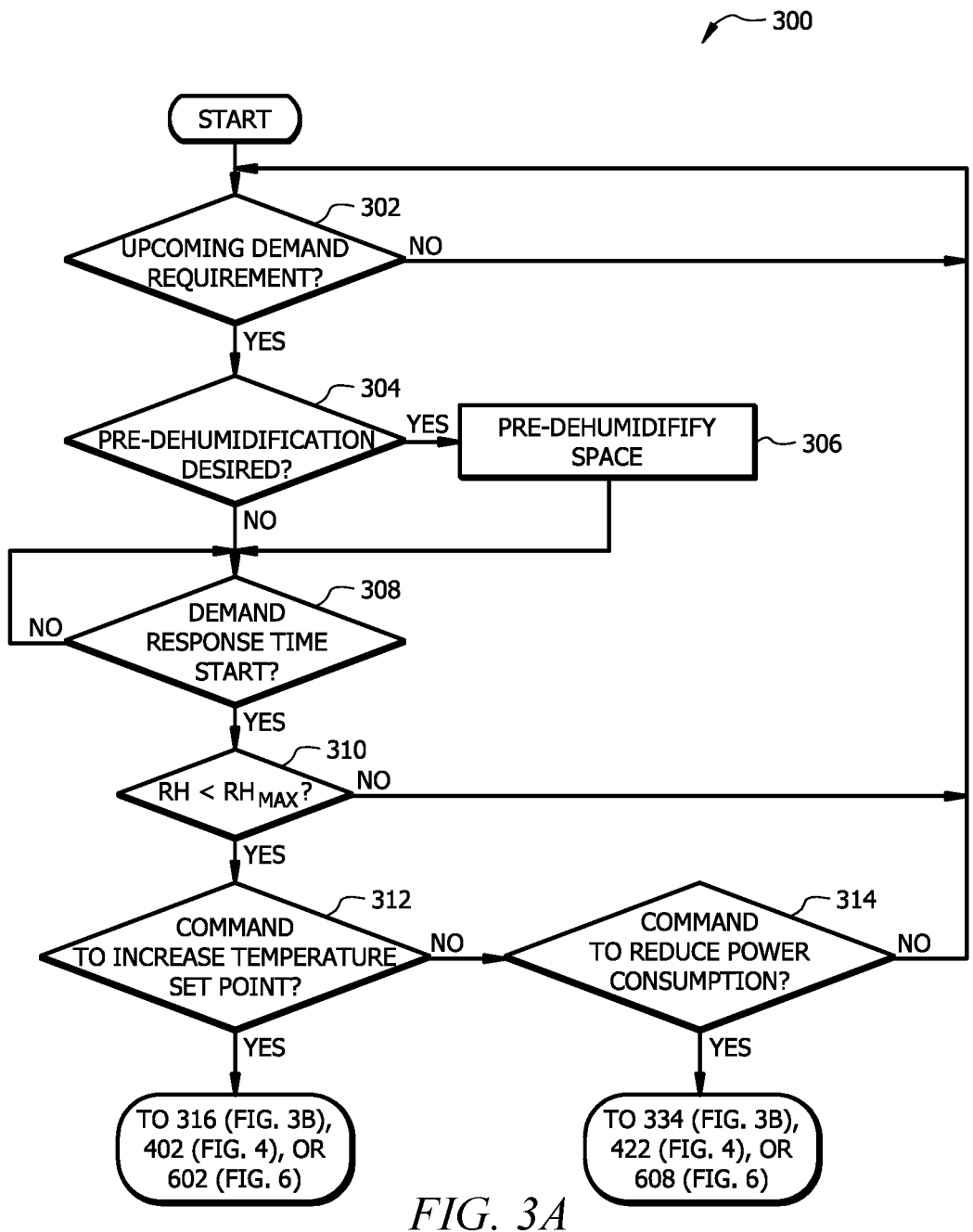
FIGS. 3A-B are flowcharts illustrating example methods of operating an HVAC system of FIG. 1.
Figure 3B:
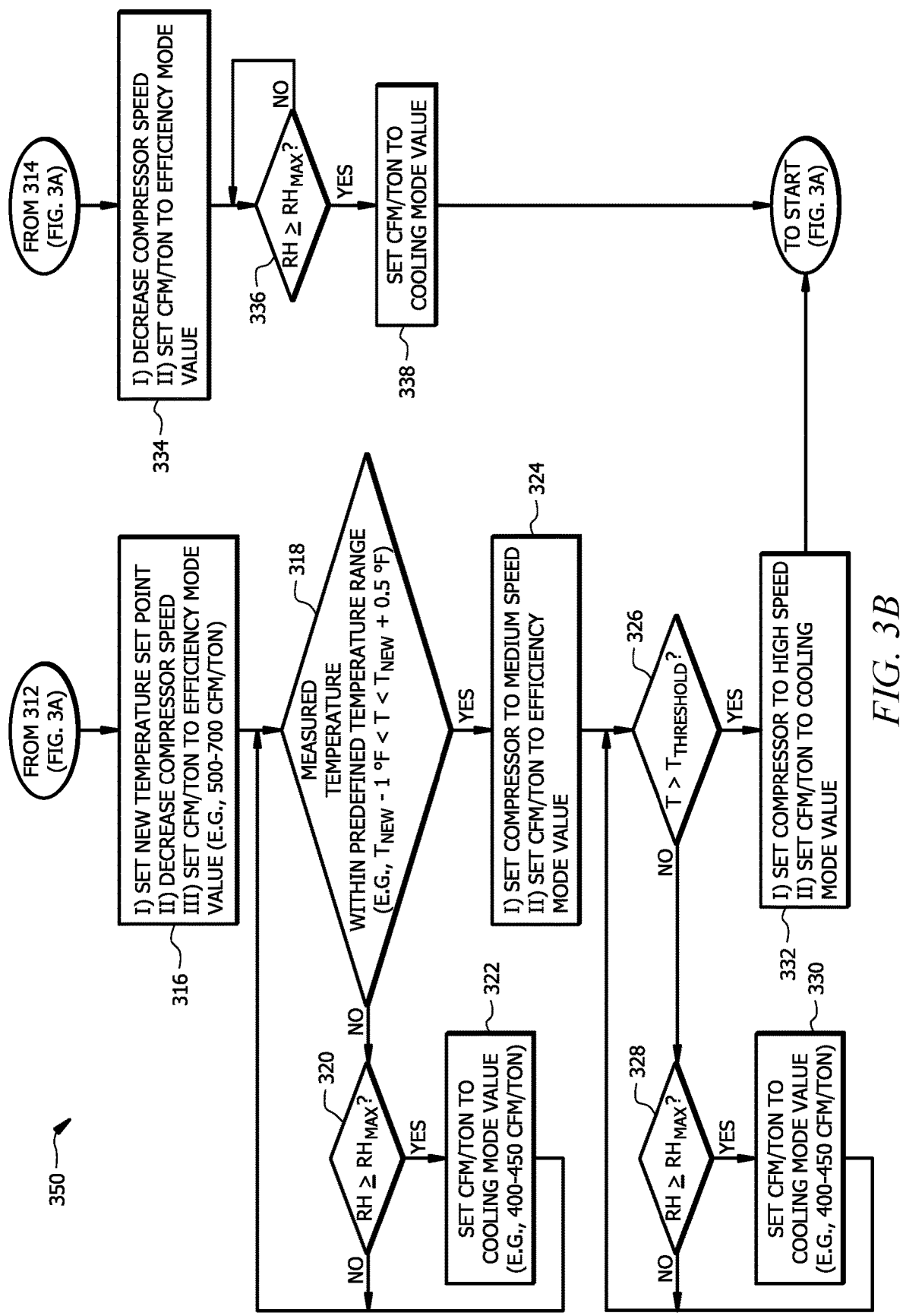

First Efficiency Mode Operation Based on Operating at a Predefined CFM/Ton Value FIGS. 3A-B are flowcharts illustrating example methods 300, 350 of operating the HVAC system 100 of FIG. 1 in response to receiving a demand request 138. The method 300 generally includes initial steps which may be performed following receipt of a demand request 138 and before different process flows are executed based on whether the demand request 138 is associated with setting a required setpoint temperature (leading to steps 316, 402, and 602 of FIGS. 3B, 4, and 6, respectively) or reducing power consumption (leading to steps 334, 422, and 608 of FIGS. 3B, 4, and 6, respectively). As such, the method 300 may include preliminary steps that precede any of the methods described in this disclosure including those described with respect to FIGS. 3B, 4, and 6 below.

The method 300 may begin at step 302 where the controller 136 determines whether there is an upcoming demand requirement (e.g., a requirement for operating the HVAC system 100 at a predefined setpoint temperature or at a predefined percentage of power consumption based on a received demand request 138). If there is no upcoming demand requirement, the method 300 may return to start to continue monitoring for an upcoming demand requirement (e.g., based on the receipt of a demand request 138).

If an upcoming demand requirement is identified at step 302, the controller 136 determines, at step 304, whether to dehumidify the conditioned space prior to the start of the peak demand response time associated with the demand request 138. For example, the controller 136 may receive a relative humidity measurement associated with the conditioned space from sensor 130b and/or any other sensor of the HVAC system 100 and determine whether the measured relative humidity is greater than a threshold value. If the relative humidity is greater than the threshold value then pre-dehumidification may be desired at step 304, and pre-dehumidification may be performed at step 306. At step 306, pre-dehumidification may involve operating the HVAC system in a dehumidification mode associated with a relatively low S/T value. For example, the speeds of the compressor 106 and/or the blower 128 may be adjusted to operate the HVAC system 100 at a CFM/ton value that is in a range from about 100 CFM/ton to less than 400 CFM/ton. For example, the CFM/ton value may be adjusted to a value of less than 400 CFM/ton to dehumidify the conditioned space with or without providing substantial cooling to the conditioned space.

At step 308, the controller 136 determines whether the start of the peak demand response time has been reached. The controller 136 generally continues to wait until this time is reached. After or upon reaching the start of the peak demand response time, the controller 136 may determine whether the relative humidity (RH) of the conditioned space is less than a maximum relative humidity value ($RH_{max}$), at step 310. If this criteria is not satisfied, subsequent steps associated with efficiency mode operation may not be performed. This may prevent the conditioned space from becoming excessively or uncomfortably humid during efficiency mode operation.

Otherwise, if the criteria are satisfied at step 310, the controller 136 may proceed to step 312 to determine whether the demand request 138 is associated with a requirement to operate at a predefined setpoint temperature. If this is the case, the controller 136 may proceed to step 316, 402, or 602 of FIGS. 3B, 4, and 6, respectively. If this is not the case, the controller 136 determines whether the demand request 138 is associated with operation at a predefined percentage reduction of power at step 314. If this is the case, the controller 136 proceeds to step 334, 422, and 608 of FIGS. 3B, 4, and 6, respectively.

FIG. 3B is a flowchart illustrating an example method 350 of operating the HVAC system 100 of FIG. 1 in an efficiency mode using a predefined CFM/ton value. Method 350 may follow from step 312 or step 314 of FIG. 3A, based on whether the received demand request 138 requires operation at predefined setpoint temperature (starting from step 312) or a predefined reduction of power consumption (starting from step 314), as shown in FIG. 3B.

If the demand request 138 is associated with a requirement to operate the HVAC system 100 at a predefined setpoint temperature, the method 350 may begin at step 316. At step 316, the temperature setpoint 134 is adjusted to the predefined setpoint temperature associated with the demand request 138. For example, the demand request 138 may be associated with a predefined (e.g., defined by the third party 140) setpoint temperature that is a particular value (e.g., 77° F. or greater). In some cases, the predefined setpoint temperature may be provided as an amount to increase the temperature setpoint 134. For example, the demand request 138 may specify a temperature difference value (of about 1 to 10° F.), and the temperature setpoint 134 may be increased by the temperature difference value. At step 316, the speed of the compressor 106 is also decreased. For example, the compressor 106 may be adjusted to operate in a low speed mode (e.g., at a speed that is 75% or less of a recommended speed of the compressor 106). For example, the low speed mode may correspond to a speed of the compressor 106 of about 30 Hz or less. The speed of the blower 128 is adjusted such that the HVAC system 100 operates at an efficiency mode CFM/ton value. The efficiency mode CFM/ton value is generally larger than the CFM/ton value associated with normal cooling operation (e.g., of about 400 CFM/ton). For example, the efficiency mode CFM/ton value may be in a range from about 500 CFM/ton to about 700 CFM/ton. Operation at an increased CFM/ton value generally corresponds to operation at an increased S/T ratio. Operation at the efficiency mode CFM/ton value may correspond to operation at an S/T ratio of about 0.9 or greater.

At step 318, the controller 136 determines whether a measured temperature (e.g., a temperature of the conditioned space or the temperature of a zone or portion of the conditioned space) is within a predefined range of the new temperature setpoint ($T_{new}$) established at step 316. For example, the controller may determine whether the measured temperature is greater than $T_{new}-1°$ F. and less than $T_{new}+0.5°$ F. (e.g., as shown in the example of FIG. 3B). If the measured temperature is not within this range, the controller 136 proceeds to step 320 and determines whether the relative humidity associated with the conditioned space is greater than or equal to the maximum relative humidity value. If the relative humidity value is greater than or equal to the maximum relative humidity value, the controller 136 proceeds to step 322 and adjusts the speed of the blower 128 such that the HVAC system 100 operates at a normal cooling mode CFM/ton value (e.g., of about 400 to 450 CFM/ton). Operation at the normal cooling mode CFM/ton value may correspond to operation at an S/T ratio in a range from about 0.7 to about 0.75. Otherwise, if the relative humidity value is not greater than or equal to the maximum relative humidity value, the HVAC system 100 continues to operate according to the efficiency mode associated with step 316.

If at step 318 the measured temperature is within the temperature range associated with this step, the controller 136 proceeds to step 324. At step 324, the speed of the compressor 106 is increased to a medium speed (e.g., in a range from greater than 30 Hz to about 50 Hz), and the speed of the blower 128 is adjusted such that the HVAC system 100 continues to operate according to the efficiency mode CFM/ton value (e.g. in a range from about 500 CFM/ton to about 700 CFM/ton). As described above, operation at the efficiency mode CFM/ton value may correspond to operation at an S/T ratio of about 0.9 or greater.

At step 326, the controller 136 determines whether a measured temperature (e.g., a temperature of the conditioned space or the temperature of a zone or portion of the conditioned space) is greater than a threshold temperature ($T_{threshold}$). For example, the threshold temperature may be $T_{new}+0.5°$ F. If the measured temperature is not greater than the threshold temperature, the controller 136 proceeds to step 328 and determines whether a relative humidity associated with the conditioned space is greater than or equal to the maximum relative humidity value. If the relative humidity is greater than or equal to the maximum relative humidity value, the controller 136 proceeds to step 330 and adjusts the speed of the blower 128 such that the HVAC system 100 operates at a normal cooling mode CFM/ton value (e.g., of about 400 to 450 CFM/ton). Otherwise, if the relative humidity is not greater than or equal to the maximum relative humidity value, the HVAC system 100 continues to operate in the efficiency mode associated with step 324 (i.e., at a medium compressor speed and an efficiency mode CFM/ton value). If at step 326 the measured temperature is greater than the threshold temperature, the speed of the compressor 106 is set to a high speed (e.g., a speed greater than 50 Hz, e.g., a speed of 60 Hz, e.g., a maximum recommended speed of the compressor 106) at step 332. The speed of the blower 128 is adjusted such that the HVAC system operates at a normal cooling mode CFM/ton value (e.g., of about 400 to 450 CFM/ton).

If the demand request 138 is associated with a requirement to reduce power consumption, the method 350 may begin at step 334. At step 334, the speed of the compressor 106 is decreased. For example, the compressor 106 may be adjusted to operate in a low speed mode (e.g., at a speed of about 30 Hz or less). The speed of the blower 128 is adjusted such that the HVAC system 100 operates at an efficiency mode CFM/ton value. As described above, the efficiency mode CFM/ton value is generally larger than the CFM/ton value associated with normal cooling operation (e.g., of about 400 to 450 CFM/ton). For example, the efficiency mode CFM/ton value may be in a range from about 500 CFM/ton to about 700 CFM/ton, as described above.

At step 336, the controller 136 determines whether a measured relative humidity associated with the conditioned space is greater than or equal to the maximum relative humidity value. If the relative humidity value is greater than or equal to the maximum relative humidity value, the controller 136 proceeds to step 338 and adjusts the speed of the compressor 106 and the speed of the blower 128 such that the HVAC system 100 operates at a normal cooling mode CFM/ton value (e.g., of about 400 to 450 CFM/ton). At step 338, the compressor speed may be increased to a medium speed value initially (e.g., a speed in a range from greater than 30 to about 50 Hz) before increasing the speed to a high speed of greater than 50 Hz or at a maximum recommended speed of the compressor 106 (e.g., at 60 Hz). Otherwise, if at step 336 the relative humidity value is not greater than or equal to the maximum relative humidity value, the HVAC system 100 continues to operate according to the efficiency mode associated with step 334.

Modifications, additions, or omissions may be made to methods 300 and 350 depicted in FIGS. 3A-B. Methods 300 and 350 may include more, fewer, or other steps. For example, steps may be performed in parallel or in any suitable order. While at times discussed as controller 136, HVAC system 100, or components thereof performing the steps, any suitable HVAC system or components of the HVAC system may perform one or more steps of the method.

Figure 4:
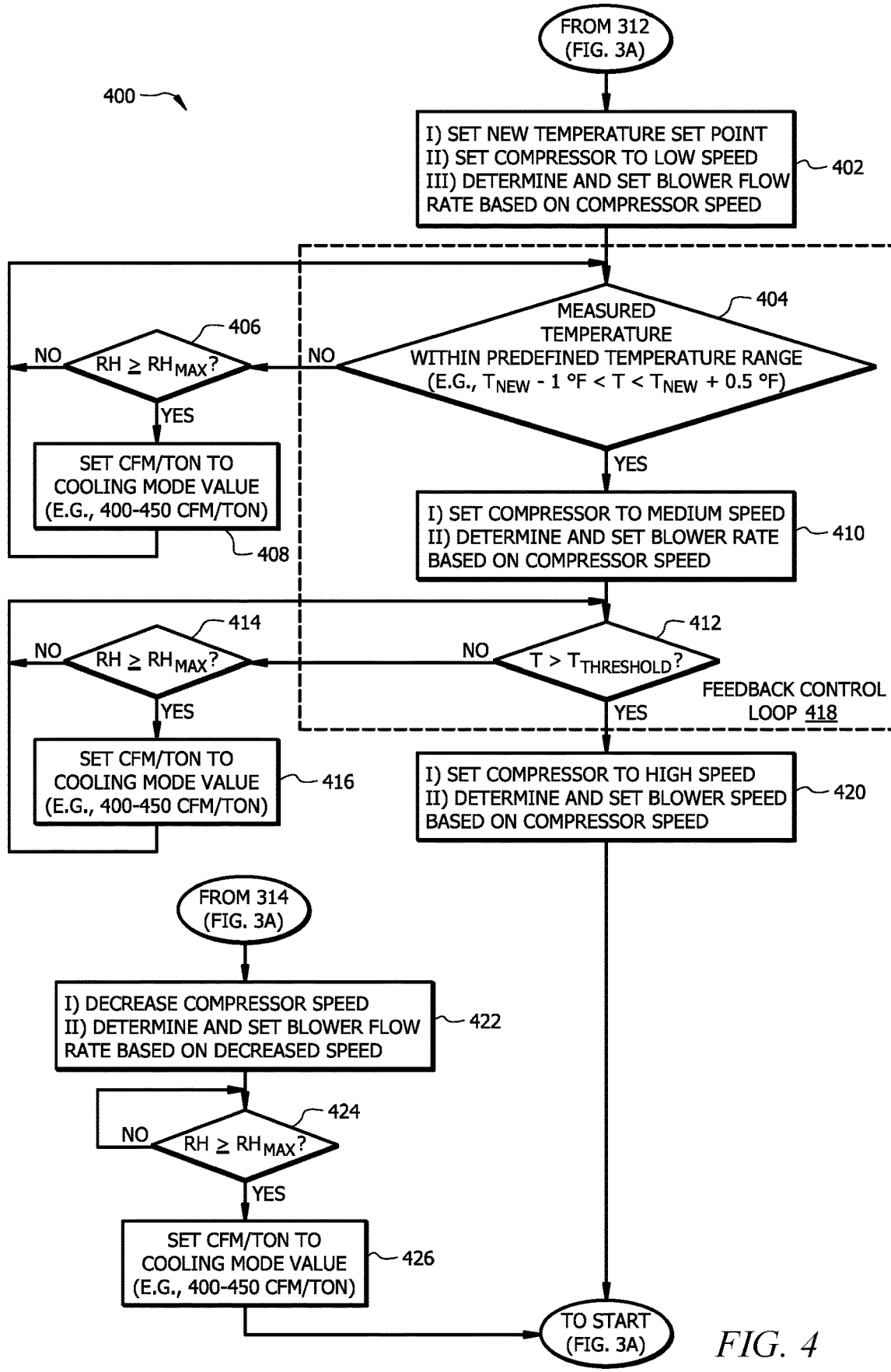
FIG. 4 is a flowchart illustrating a further example method of operating the HVAC system of FIG. 1.

Second Efficiency Mode Operation Based on Calculated CFM/Ton and/or Feedback Control FIG. 4 is a flowchart of an example method 400 of operating the HVAC system 100 of FIG. 1 in an efficiency mode using a calculated CFM/ton value. For example, a CFM/ton value may be calculated according to a relationship that is specific to the HVAC system 100 such that efficiency and/or sensible capacity can be further improved during peak demand response times. As described in greater detail below, certain steps of method 400 may be implemented using a feedback control loop 418. Method 400 may start from step 312 or step 314 of method 300 shown in FIG. 3A based on whether the received demand request 138 requires operation at a predefined setpoint temperature (starting from step 312 of FIG. 3A) or a predefined reduction of power consumption (starting from step 314 of FIG. 3A). In some embodiments, the method 400 may be employed when the cooling unit 116 of the HVAC system 100 is a row split/intertwined evaporator.

If the demand request 138 is associated with a requirement to operate the HVAC system 100 at a predefined setpoint temperature, the method 400 may begin from step 312 of FIG. 3A at step 402. At step 402, the temperature setpoint 134 is adjusted to the predefined setpoint temperature associated with the demand request 138. For example, as described above, the demand request 138 may be associated with a predefined setpoint temperature that is a particular value (e.g., 77° F. or greater). In some cases, the predefined setpoint temperature may be provided via a required increase in the temperature setpoint 134. For example, the demand request 138 may specify a temperature difference value (e.g., of about 1 to 10° F.), and the temperature setpoint 134 may be increased by the temperature difference value.

At step 402, the speed of the compressor 106 is decreased. For example, the compressor 106 may be adjusted to operate in a low speed mode (e.g., a speed of about 30 Hz or less). A blower speed is determined based on the compressor speed, and the speed of the blower 128 is adjusted based on this determined blower speed. For example, the blower speed may be determined using a predefined relationship between blower speed and compressor speed (e.g., a formula, lookup table, or the like). The predefined relationship may facilitate operation at an increased sensible energy efficiency ratio, a preferred (e.g., increased) S/T ratio, or the like. An example of a relationship for determining a blower speed may be: Blower speed=A(compressor speed)$^2$+B (compressor speed)+C, where A, B, and C are constant values. The constants A, B, and C may be specific to the HVAC system 100 and may be determined, for example, through calibration or other appropriate testing to facilitate operation of the HVAC system 100 in an efficiency mode which provides increased cooling capacity, efficiency, and/or comfort during a peak demand response time.

At step 404, the controller 136 determines whether a measured temperature (e.g., a temperature of the conditioned space or the temperature of a zone or portion of the conditioned space) is within a predefined range of the new temperature setpoint ($T_{new}$) established at step 402. For example, the controller may determine whether the measured temperature is greater than $T_{new}$−1° F. and less than $T_{new}$+0.5° F. (e.g., as shown in the example of FIG. 3B). If the measured temperature is not within this range, the controller 136 proceeds to step 406 and determines whether the relative humidity of the conditioned space is greater than or equal to the maximum relative humidity value. If the relative humidity value is greater than or equal to the maximum relative humidity value, the controller 136 proceeds to step 408 and adjusts the speed of the blower 128 such that the HVAC system 100 operates at a normal cooling mode CFM/ton value (e.g., of about 400 to 450 CFM/ton). Otherwise, if the relative humidity value is not greater than or equal to the maximum relative humidity value, the HVAC system 100 continues to operate in the efficiency mode associated with step 402 (i.e., at the decreased compressor speed and the blower speed determined based on the compressor speed).

If at step 404 the measured temperature is within the temperature range associated with this step, the controller 136 proceeds to step 410. At step 410, the compressor 106 is increased to a medium speed (e.g., in a range from greater than 30 Hz to about 50 Hz), and a new speed is determined for the blower 128. For example, the new speed for the blower 128 may be determined based on a predefined relationship, as described above. The speed of the blower 128 is adjusted based on this newly determined speed. For example, the speed of the blower 128 may be adjusted to the determined speed or to a speed within about 5% of the determined speed.

At step 412, the controller determines whether a measured temperature (e.g., a temperature of the conditioned space or the temperature of a zone or portion of the conditioned space) is greater than a threshold temperature. For example, the threshold temperature may be $T_{new}$+0.5° F. If the measured temperature is not greater than the threshold temperature, the controller 136 proceeds to step 414 and determines whether a relative humidity associated with the conditioned space is greater than or equal to the maximum relative humidity value. If the relative humidity is greater than or equal to the maximum relative humidity value, the controller 136 proceeds to step 416 and adjusts the speed of the blower 128 such that the HVAC system 100 operates at a normal cooling mode CFM/ton value (e.g., of about 400 to 450 CFM/ton). Otherwise, if the relative humidity is not greater than or equal to the maximum relative humidity value, the HVAC system 100 continues to operate in the efficiency mode associated with step 410 (i.e., at a medium compressor speed and a blower speed based on the compressor speed). Returning to step 412, if the measured temperature is greater than the threshold temperature, the compressor 106 is set to a high speed (e.g., a speed greater than 50 Hz), and a speed is determined for the blower 128 at step 420. The speed of the blower 128 is set based on the determined speed, as described above.

In some embodiments, steps 404, 410, and 412 may be implemented in a more continuous manner using a feedback control loop 418. For example, proportional-integral (PI) control may be used to implement these steps of the method 400 such that the speed of the compressor 106 is gradually adjusted (e.g., increased) during a peak demand response time, based on the measured temperature, and the speed of the blower 128 is similarly adjusted (e.g., based on a predefined relationship as described above) to a value determined based on the speed of the compressor 106. Feedback control loop 418 may facilitate efficient adjustment of the speed of the compressor 106 and blower 128 to provide improved comfort to a conditioned space during a peak demand response time. For example, the feedback control loop 418 may facilitate operation of the HVAC system 100 at in increased sensible capacity such that the temperature of a conditioned space may be held at a lower temperature for a greater portion of a peak demand response time than was possible using previous technologies.

If the demand request 138 is associated with a requirement to reduce power consumption, the method 400 may begin from step 314 of FIG. 3A at step 422. At step 422, the speed of the compressor 106 is decreased. For example, the compressor 106 may be adjusted to operate in a low speed mode (e.g., at a speed of about 30 Hz or less). A speed is determined for the blower 128 based on the decreased blower speed (e.g., as described above), and/or the speed of the blower 128 is adjusted based on the determined speed. At step 424, the controller 136 determines whether a measured relative humidity (e.g., a relative humidity of the conditioned space or of a zone of the conditioned space) is greater than or equal to the maximum relative humidity value. If the relative humidity value is greater than or equal to the maximum relative humidity value, the controller 136 proceeds to step 426 and adjusts the speed of the compressor 106 and/or the speed of the blower 128 such that the HVAC system 100 operates at a normal cooling mode CFM/ton value (e.g., of about 400 to 450 CFM/ton). For example, the compressor speed may be increased to a medium speed value initially (e.g., a speed in a range from greater than 30 Hz to about 50 Hz) before the speed is gradually increased to a high speed of greater than 50 Hz (e.g., and up to the maximum recommended compressor speed). Otherwise, if the relative humidity value is not greater than or equal to the maximum relative humidity value, the HVAC system 100 continues to operate according to the efficiency mode associated with step 422.

Modifications, additions, or omissions may be made to method 400 depicted in FIG. 4. Method 400 may include more, fewer, or other steps. For example, steps may be performed in parallel or in any suitable order. While at times discussed as controller 136, HVAC system 100, or components thereof performing the steps, any suitable HVAC system or components of the HVAC system may perform one or more steps of the method.

Third Efficiency Mode Operation of an HVAC System with a Face-Split Evaporator

In some embodiments, the cooling unit 116 of the HVAC system 100 shown in FIG. 1 is a face-split evaporator. FIG. 5 shows an illustrative example of a face-split evaporator 500. The cooling unit 116 of FIG. 1 may be or include the face-split evaporator 500. As shown in FIG. 5, the face-split evaporator 500 includes at least a top evaporator circuit 502 and a bottom evaporator circuit 504. Generally, each of the evaporator circuits 502 and 504 is associated with a corresponding condensing unit 506 and 512, respectively. Condensing unit 506 may include a compressor 508 and a condenser 510, and condensing unit 512 may include a compressor 514 and a condenser 516. The one or more condensing units 104 of FIG. 1 may include condensing units 506 and 512.

A portion 118a of the airflow 118 of FIG. 1 may flow through the top circuit 502 and exit the top circuit 502 as cooled airflow portion 120a. When airflow portion 118a flows through the top circuit 502, water vapor from airflow 118a may condense on the coils of the top circuit 502. At least a portion of this condensed water may fall on the surface (e.g., the surface of coils) of the bottom circuit 504. Even when the condensing unit 512 of the bottom evaporator circuit 504 is turned off (i.e., when compressor 514 is turned off), an airflow portion 118b of the airflow 118 may flow through the bottom circuit 504 and be evaporatively cooled via contact with the water received from the top circuit 502. Evaporatively cooled airflow portion 120b may exit the bottom circuit 504. Airflow 120 of FIG. 1 may include each of airflows 120a and 120b of FIG. 5.

In some embodiments, the face-split evaporator 500 is positioned above a drain pan 518 which captures water falling from the evaporator 500 (i.e., water not retained on the surface of the bottom circuit 504). At least a portion of the water captured in the drain pan 518 may be absorbed by an air-permeable media 520 and used to provide further evaporative cooling of airflow portion 118b. For example, the media 520 may be in fluidic contact with the drain pan 518 via a fluidic connection 522 or may be inserted directly in a portion of the drain pan 518. The fluidic connection 522 may be a channel, tube, a section of water-absorbing or water-permeable material (e.g., the same material or a different material to that of the air-permeable media 520) or any other appropriate element for providing transfer of water from the drain pan 518 to the media 520. At least a portion of airflow 118a may flow through media 520 and contact water on and/or within the media 520, thereby providing further evaporative cooling to the airflow portion 118b and improved cooling to airflow 120 of FIG. 1, even when the compressor 514 is turned off to conserve power and satisfy requirements of the demand request 138.

Figure 5:
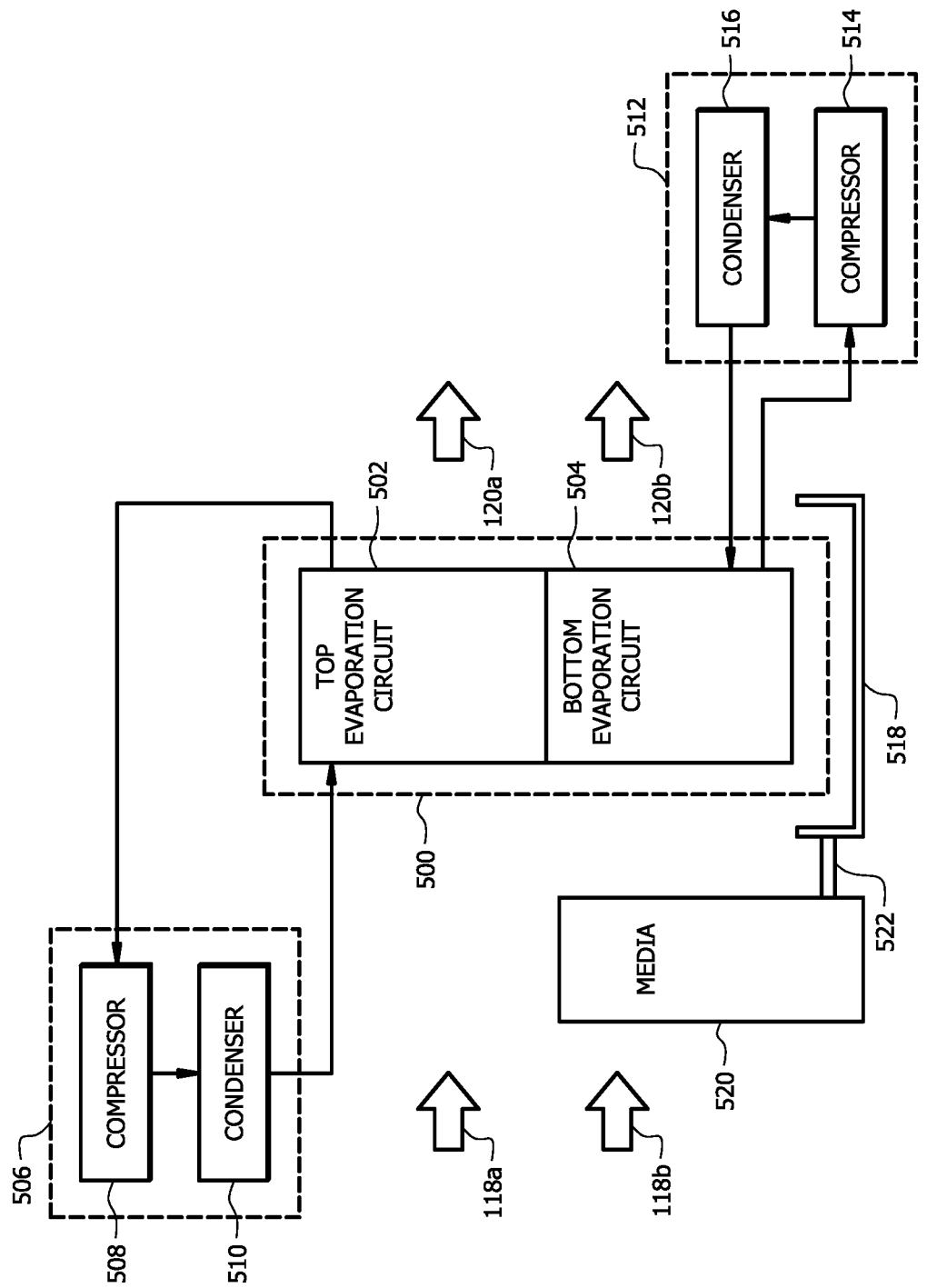
FIG. 5 is a diagram of an example face-split evaporator for use in the system of FIG. 1.
Figure 6:
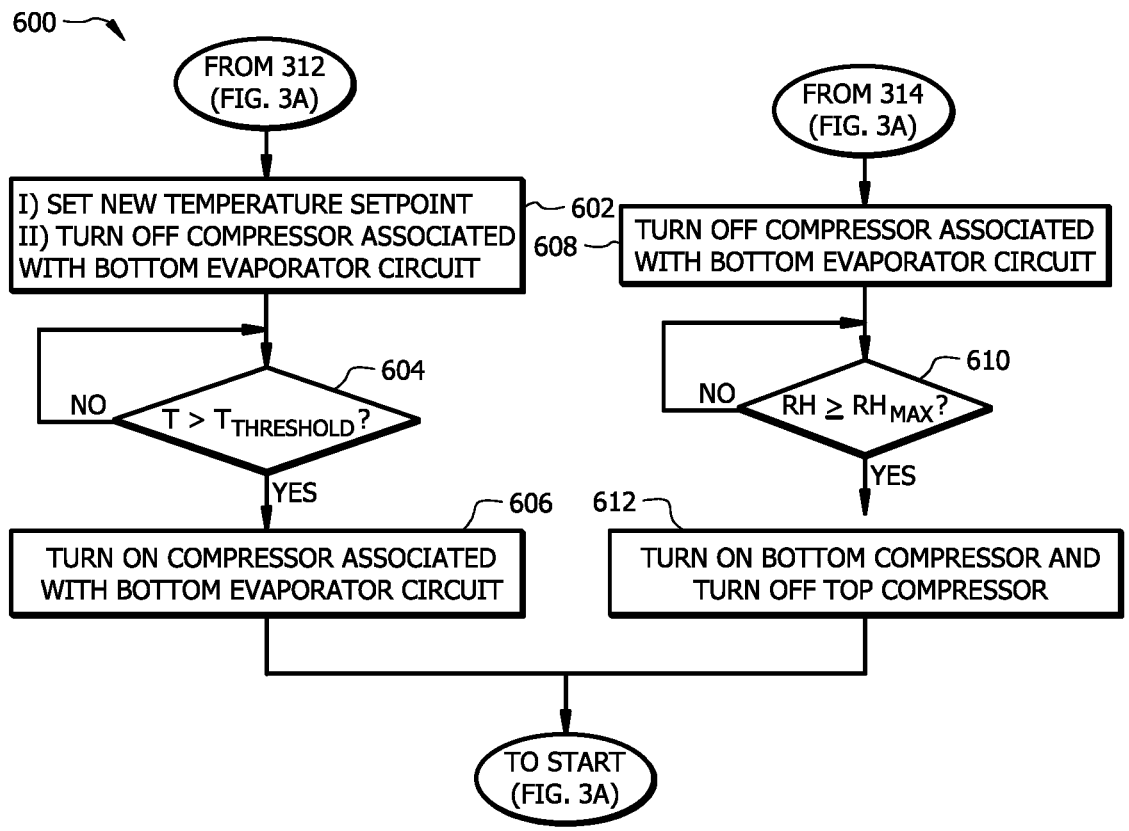
FIG. 6 is a flowchart of an example method of operating the HVAC system of FIG. 1 employing the face-split evaporator of FIG. 5 to improve sensible capacity during a peak demand response time.

FIG. 6 is a flowchart illustrating example method 600 of operating the HVAC system 100 of FIG. 1 when the cooling unit 116 includes the face-split evaporator 500 of FIG. 5. If the demand request 138 is associated with a requirement to operate the HVAC system 100 at a predefined setpoint temperature, the method 600 may begin from step 312 of FIG. 3A at step 602. At step 602, the temperature setpoint 134 is adjusted to the predefined setpoint temperature associated with the demand request 138 (as described above for methods 350 and 400), and the compressor 514 associated with the bottom evaporator circuit 504 is turned off. Turning off compressor 514 allows the bottom evaporator circuit 504 to act as an evaporative cooler without requiring additional power consumption. For example, water condensate formed on the top evaporator circuit 502 may fall on the surface of the bottom evaporator circuit 504 and evaporatively cool airflow 118b flowing across the otherwise inactive circuit 504, as described above with respect to FIG. 5. At step 604, the controller determines whether a measured temperature (e.g., a temperature of the conditioned space or the temperature of a zone or portion of the conditioned space) is greater than a threshold temperature. For example, the threshold temperature may be $T_{new}+0.5°$ F. If the measured temperature is greater than the threshold temperature, the controller 136 proceeds to step 606 and turns on the compressor 514 associated with the bottom evaporator circuit 504.

If the demand request 138 is associated with a requirement to reduce power consumption, the method 600 may begin from step 314 of FIG. 3A at step 608. At step 608, the controller 136 turns off the compressor 514 associated with the bottom evaporator circuit 504, thereby allowing the bottom evaporator circuit 504 to act as an evaporative cooler without consuming power via operation of compressor 514, as described above with respect to step 602. If the power consumed by the HVAC system is not decreased sufficiently to satisfy a percentage of power consumption associated with the demand request 138, the controller 138 may further decrease the speed of the compressor 508 and/or of the blower 128. At step 610, the controller 136 determines whether a measured relative humidity is greater than or equal to the maximum relative humidity value. If the relative humidity value is greater than or equal to the maximum relative humidity value, the controller 136 proceeds to step 612 and turns on the compressor 514 associated with the bottom evaporator circuit 504 and turns on the compressor 508 associated with the top evaporator circuit 502. This facilitates operation at a decreased power consumption as required by the demand request 138 (i.e., with one compressor turned off), while preventing a further increase in relative humidity by no longer providing for substantial evaporative cooling in the bottom evaporator circuit 514, which was facilitated by shutting down the compressor 514 associated with the bottom evaporator circuit 504. Otherwise, if the relative humidity value is not greater than or equal to the maximum relative humidity value, the HVAC system 100 continues to operate in the efficiency mode with the compressor 514 turned off.

Modifications, additions, or omissions may be made to method 600 depicted in FIG. 6. Method 600 may include more, fewer, or other steps. For example, steps may be performed in parallel or in any suitable order. While at times discussed as controller 136, HVAC system 100, or components thereof performing the steps, any suitable HVAC system or components of the HVAC system may perform one or more steps of the method.

Example Controller

Figure 7:
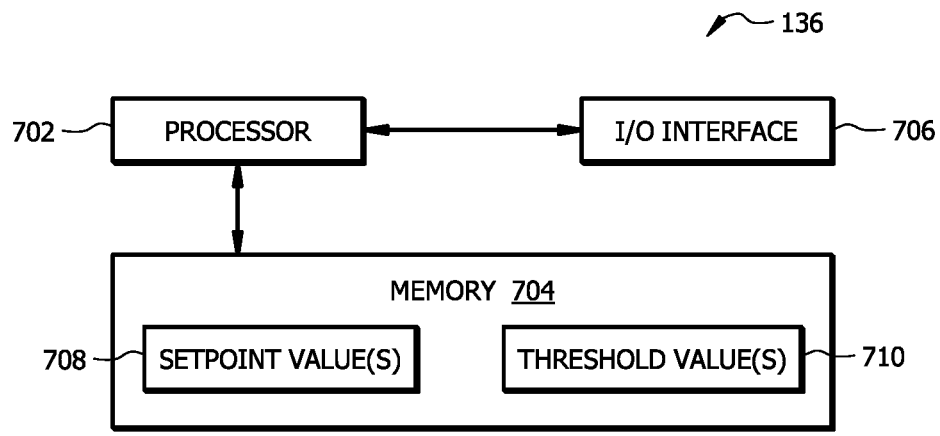
FIG. 7 is a diagram of the controller of the example HVAC system of FIG. 1.

FIG. 7 is a schematic diagram of an embodiment of the controller 136. The controller 136 includes a processor 702, a memory 704, and an input/output (I/O) interface 706.

The processor 702 includes one or more processors operably coupled to the memory 704. The processor 702 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 704 and controls the operation of HVAC system 100. The processor 702 may be a programmable logic device, a microcontroller, a microprocessor, or any suitable combination of the preceding. The processor 702 is communicatively coupled to and in signal communication with the memory 704. The one or more processors are configured to process data and may be implemented in hardware or software. For example, the processor 702 may be 8-bit, 16-bit, 32-bit, 64-bit or of any other suitable architecture. The processor 702 may include an arithmetic logic unit (ALU) for performing arithmetic and logic operations, processor registers that supply operands to the ALU and store the results of ALU operations, and a control unit that fetches instructions from memory 704 and executes them by directing the coordinated operations of the ALU, registers, and other components. The processor may include other hardware and software that operates to process information, control the HVAC system 100, and perform any of the functions described herein (e.g., with respect to FIG. 3). The processor 702 is not limited to a single processing device and may encompass multiple processing devices. Similarly, the controller 136 is not limited to a single controller but may encompass multiple controllers.

The memory 704 includes one or more disks, tape drives, or solid-state drives, and may be used as an over-flow data storage device, to store programs when such programs are selected for execution, and to store instructions and data that are read during program execution. The memory 704 may be volatile or non-volatile and may include ROM, RAM, ternary content-addressable memory (TCAM), dynamic random-access memory (DRAM), and static random-access memory (SRAM). The memory 704 is operable to store one or more setpoints 708 and threshold values 710.

The one or more setpoints 708 include but are not limited to the temperature setpoint 134 of FIG. 1. In general, the setpoint(s) 708 may include any temperature, relative humidity, or other setpoints used to configure cooling or heating functions of the HVAC system 100 and/or operation of the HVAC system 100 according to any of the efficiency modes described in this disclosure. For example, the setpoint(s) may include a predefined setpoint temperature received with or as a part of the demand request 138. The threshold values 710 include any of the thresholds used to implement the functions described herein including, for example, the threshold temperatures, maximum relative humidity values, and temperature range values described with respect to the methods of FIGS. 3A-B, 4, and 6 above.

The I/O interface 706 is configured to communicate data and signals with other devices. For example, the I/O interface 706 may be configured to communicate electrical signals with components of the HVAC system 100 including the compressor 106, the expansion valve 114, the blower 128, sensors 130a-b, and the thermostat 132. For cases where the HVAC system includes a face-split evaporator 500 (e.g., as described with respect to FIGS. 5 and 6 above), the I/O interface 706 provides communication with compressors 508 and 514. The I/O interface may provide and/or receive, for example, compressor speed signals blower speed signals, temperature signals, relative humidity signals, thermostat calls, temperature setpoints, environmental conditions, and an operating mode status for the HVAC system 100 and send electrical signals to the components of the HVAC system 100. The I/O interface 706 may include ports or terminals for establishing signal communications between the controller 136 and other devices. The I/O interface 706 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation, and air conditioning (HVAC) system comprising:
   a variable-speed compressor configured to compress refrigerant flowing through the HVAC system;
   a blower configured to provide a flow of air through the HVAC system at a controllable flow rate; and
   a controller communicatively coupled to the variable-speed compressor and the blower, the controller configured to:
      receive a demand request, the demand request comprising a command to operate the HVAC system at a predefined setpoint temperature for a time interval corresponding to a peak demand response time; and
      in response to receiving the demand request:
         adjust a setpoint temperature associated with the HVAC system to the predefined setpoint temperature;
         decrease a speed of the variable-speed compressor to a low-speed setting of less than or equal to 30 Hz, wherein a sensible heat ratio of the HVAC system is increased in response to decreasing the speed of the variable-speed compressor;
         determine whether a temperature of a space conditioned by the HVAC system is within a temperature range encompassing the predefined setpoint temperature; and
         in response to determining the temperature of the space is not within the temperature range, increase the speed of the variable-speed compressor to a medium-speed setting of between 30 Hz and 50 Hz.

2. The HVAC system of claim 1, wherein the controller is further configured to, in response to receiving the demand request, determine an air-flow rate at which to provide the flow of air by the blower based on a predefined relationship between the speed of the variable-speed compressor and the air-flow rate provided by the blower.

3. The HVAC system of claim 2, wherein the predefined relationship comprises a lookup table or formula relating air-flow rate to compressor speed.

4. The HVAC system of claim 1, wherein the controller is further configured to, in response to receiving the demand request, adjust a controllable flow rate of the flow of air provided by the blower to a determined air-flow rate such that the HVAC system is operated at an increased ratio of blower flow rate to tonnage of cooling (CFM/ton ratio) compared to a CFM/ton ratio associated with the HVAC system prior to receipt of the demand request.

5. The HVAC system of claim 4, the controller further configured to:
   determine an air-flow rate based at least upon the increased speed of the variable-speed compressor; and
   adjust the controllable flow rate of the flow of air provided by the blower to the air-flow rate.

6. The HVAC system of claim 5, the controller further configured to:
   determine whether the temperature of a space conditioned by the HVAC system is greater than a threshold temperature;
   in response to determining the temperature of the space is greater than a threshold temperature, further increase the speed of the variable-speed compressor to a high-speed setting of greater than 50 Hz;
   determine an updated air-flow rate, based on the further increased speed of the variable-speed compressor; and
   adjust the controllable flow rate of the flow of air provided by the blower to the updated air-flow rate.

7. The HVAC system of claim 4, the controller further configured to:
   determine if a relative humidity of a space conditioned by the HVAC system is greater than a predefined maximum relative humidity value;
   in response to determining the relative humidity of the space is greater than the predefined maximum relative humidity value, adjust one or both of the speed of the variable-speed compressor and the controllable flow rate of the flow of air provided by the blower, such that a ratio of the controllable flow rate to a tonnage of cooling provided by the HVAC system is adjusted to a predefined value in a range from about 400 to about 450 cubic feet per minute per tonnage of cooling.

8. The HVAC system of claim 1, the controller further configured to maintain the temperature of the space conditioned by the HVAC system within the temperature range using a feedback control loop, wherein an input to the feedback control loop comprises the temperature of the space and an output of the feedback control loop comprises an operating speed at which to operate the variable-speed compressor.

9. The HVAC system of claim 1, wherein:
   the demand request comprises a start time associated with the command to operate the HVAC system at the predefined setpoint temperature; and
   the controller is further configured to, prior to adjusting the setpoint temperature to the predefined setpoint temperature, cause a space conditioned by the HVAC system to be dehumidified before the start time is reached.

10. A method of operating a heating, ventilation, and air conditioning (HVAC) system, the method comprising:
   receiving a demand request, the demand request comprising a command to operate the HVAC system at a predefined setpoint temperature for a time interval corresponding to a peak demand response time; and in response to receiving the demand request:
  adjusting a setpoint temperature associated with the HVAC system to the predefined setpoint temperature; and
  decreasing a speed of a variable-speed compressor of the HVAC system to a low-speed setting of less than or equal to 30 Hz, wherein a sensible heat ratio of the HVAC system is increased in response to decreasing the speed of the variable-speed compressor;
  determining whether a temperature of a space conditioned by the HVAC system is within a temperature range encompassing the setpoint temperature; and
  in response to determining the temperature of the space is not within the temperature range, increasing the speed of the variable-speed compressor to a medium-speed setting of between 30 Hz and 50 Hz.

11. The method of claim 10, further comprising, in response to receiving the demand request, determining, based on the speed of the variable-speed compressor at the low-speed setting, an air-flow rate at which to provide the flow of air by the blower based on a predefined relationship between the speed of the variable-speed compressor and the air-flow rate provided by the blower.

12. The method of claim 11, wherein the predefined relationship comprises a lookup table or formula relating air-flow rate to compressor speed.

13. The method of claim 10, further comprising, in response to receiving the demand request, adjusting a controllable flow rate of the flow of air provided by the blower to a determined air-flow rate, such that the HVAC system is operated at an increased ratio of blower flow rate to tonnage of cooling (CFM/ton ratio) compared to a CFM/ton ratio associated with the HVAC system prior to receipt of the demand request.

14. The method of claim 13, further comprising:
  determining an air-flow rate, based at least upon the increased speed of the variable-speed compressor; and
  adjusting the controllable flow rate of the flow of air provided by the blower to the air-flow rate.

15. The method of claim 14, further comprising:
  determining whether the temperature of a space conditioned by the HVAC system is greater than a threshold temperature;
  in response to determining the temperature of the space is greater than a threshold temperature, further increasing the speed of the variable-speed compressor to a high-speed setting of greater than 50 Hz;
  determining an updated air-flow rate, based on the further increased speed of the variable-speed compressor; and
  adjusting the controllable flow rate of the flow of air provided by the blower to the updated air-flow rate.

16. The method of claim 13, further comprising:
  determining if a relative humidity of a space conditioned by the HVAC system is greater than a predefined maximum relative humidity value;
  in response to determining the relative humidity of the space is greater than the predefined maximum relative humidity value, adjusting one or both of the speed of the variable-speed compressor and the controllable flow rate of the flow of air provided by the blower, such that a ratio of the controllable flow rate to a tonnage of cooling provided by the HVAC system is adjusted to a predefined value in a range from about 400 to about 450 cubic feet per minute per tonnage of cooling.

17. The method of claim 10, further comprising maintaining the temperature of the space conditioned by the HVAC system within the temperature range using a feedback control loop, wherein an input to the feedback control loop comprises the temperature of the space and an output of the feedback control loop comprises an operating speed at which to operate the variable-speed compressor.

18. The method of claim 10, wherein:
  the demand request comprises a start time associated with the command to operate the HVAC system at the predefined setpoint temperature; and
  the method further comprises, prior to adjusting the setpoint temperature to the predefined setpoint temperature, causing a space conditioned by the HVAC system to be dehumidified before the start time is reached.

19. A heating, ventilation, and air conditioning (HVAC) system comprising:
  a variable-speed compressor configured to compress refrigerant flowing through the HVAC system;
  a blower configured to provide a flow of air through the HVAC system at a controllable flow rate; and
  a controller communicatively coupled to the variable-speed compressor and the blower, the controller configured to:
    receive a demand request, the demand request comprising a command to reduce power consumption by the HVAC system by a predefined percentage for a time interval corresponding to a peak demand response time; and
    in response to receiving the demand request, decrease a speed of the variable-speed compressor by at least the predefined percentage of the command to reduce power consumption, such that the variable-speed compressor operates at a low-speed setting of less than or equal to 30 Hz, wherein a sensible heat ratio of the HVAC system is increased in response to decreasing the speed of the variable-speed compressor, wherein a power consumption of the HVAC system is decreased by at least the predefined percentage associated with the demand request based, at least in part, on the decrease in speed of the variable-speed compressor.

20. The HVAC system of claim 19, wherein the controller is further configured to, in response to receiving the demand request, determine an air-flow rate at which to provide the flow of air by the blower based on a predefined relationship between the speed of the variable-speed compressor and the air-flow rate provided by the blower.

21. The HVAC system of claim 20, wherein the predefined relationship comprises a lookup table or formula relating air-flow rate to compressor speed.

22. The HVAC system of claim 19, wherein the controller is further configured to, in response to receiving the demand request, adjust a controllable flow rate of the flow of air provided by the blower to the determined air-flow rate, such that:
  the HVAC system is operated at an increased ratio of blower flow rate to tonnage of cooling (CFM/ton ratio) compared to a CFM/ton ratio associated with the HVAC system prior to receipt of the demand request.

23. The HVAC system of claim 22, the controller further configured to:
  determine if a relative humidity of a space conditioned by the HVAC system is greater than a predefined maximum relative humidity value;
  in response to determining the relative humidity of the space is greater than the predefined maximum relative humidity value, adjust one or both of the speed of the variable-speed compressor and the controllable flow rate of the flow of air provided by the blower, such that a ratio of the controllable flow rate to a tonnage of cooling provided by the HVAC system is adjusted to a predefined value in a range from about 400 to about 450 cubic feet per minute per tonnage of cooling.

24. The HVAC system of claim 19, wherein:
the demand request comprises a start time associated with the command to operate the HVAC system at the predefined setpoint temperature; and
the controller is further configured to, prior to adjusting the setpoint temperature to the predefined setpoint temperature, cause a space conditioned by the HVAC system to be dehumidified before the start time is reached.

25. The HVAC system of claim 19, wherein the demand request is received from a third party.

\* \* \* \* \*